United States Patent
Duenas et al.

(10) Patent No.: US 9,445,107 B2
(45) Date of Patent: Sep. 13, 2016

(54) LOW LATENCY RATE CONTROL SYSTEM AND METHOD

(71) Applicant: Cavium, Inc., San Jose, CA (US)

(72) Inventors: Alberto Duenas, Mountain View, CA (US); Francisco J. Roncero Izquierdo, Leganés (ES); Gorka Garcia, Madrid (ES)

(73) Assignee: Cavium, Inc., San Jose, CA (US)

( * ) Notice: Subject to any disclaimer, the term of this patent is extended or adjusted under 35 U.S.C. 154(b) by 43 days.

(21) Appl. No.: 14/480,469

(22) Filed: Sep. 8, 2014

(65) Prior Publication Data
US 2014/0376640 A1 Dec. 25, 2014

Related U.S. Application Data

(62) Division of application No. 13/067,051, filed on May 4, 2011, now Pat. No. 8,831,108.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/176* | (2014.01) |
| *H04N 19/61* | (2014.01) |
| *H04N 19/115* | (2014.01) |
| *H04N 19/152* | (2014.01) |
| *H04N 19/174* | (2014.01) |
| *H04N 19/147* | (2014.01) |
| *H04N 19/172* | (2014.01) |
| *H04N 19/103* | (2014.01) |

(52) U.S. Cl.
CPC .......... *H04N 19/176* (2014.11); *H04N 19/103* (2014.11); *H04N 19/115* (2014.11); *H04N 19/147* (2014.11); *H04N 19/152* (2014.11); *H04N 19/172* (2014.11); *H04N 19/174* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 5,815,604 A | 9/1998 | Simons et al. | |
| 6,055,330 A | 4/2000 | Eleftheriadis et al. | |
| 7,929,603 B2 | 4/2011 | Tan et al. | |
| 2002/0034246 A1* | 3/2002 | Yamada | H04N 19/159 375/240.03 |
| 2005/0259623 A1* | 11/2005 | Garudadri | H04L 29/06 370/335 |

(Continued)

OTHER PUBLICATIONS

International Search Report and Written Opinion issued to international patent application No. PCT/US12/36646, Aug. 6, 2012, 8 pgs.

*Primary Examiner* — Frederick Bailey
*Assistant Examiner* — Talha M Nawaz
(74) *Attorney, Agent, or Firm* — Cooley LLP (57) ABSTRACT

An encoder within a video transmission system controls the bit allocation at a sub-frame level. A frame is divided into smaller blocks, known as rate control blocks. Rate control blocks are used as the basic unit for bit allocation. This bit allocation achieves the target bit rate desired by the system as well as meet latency constraints. The encoder uses the slice partitioning capabilities to generate the rate control blocks using one or more slices of the image frame. This feature allows the decoder to decode the rate control blocks independently and ensures that the encoded data size for each rate control block is allocated. The encoder also detects the overflow condition for the buffer and performing an operation to avoid the overflow condition based on whether the image frame is an inter-frame or an intra-frame.

11 Claims, 5 Drawing Sheets

(56) References Cited

U.S. PATENT DOCUMENTS

| | | |
|---|---|---|
| 2007/0031050 A1 | 2/2007 | Shin |
| 2007/0147512 A1 | 6/2007 | Eckart |
| 2007/0223576 A1* | 9/2007 | Tan .................. H04N 19/176 375/240.03 |
| 2008/0018803 A1* | 1/2008 | Tourapis ............. H04N 5/505 348/731 |
| 2008/0095246 A1* | 4/2008 | Luo ..................... H04N 19/61 375/240.27 |
| 2008/0101470 A1* | 5/2008 | Hong ................ H04N 21/242 375/240.14 |
| 2008/0196061 A1* | 8/2008 | Boyce ................ H04N 5/4401 725/38 |
| 2008/0260062 A1 | 10/2008 | Imamura |
| 2008/0304564 A1 | 12/2008 | Kim et al. |
| 2009/0279611 A1 | 11/2009 | Gao |
| 2009/0310672 A1* | 12/2009 | Rao ..................... H04N 7/148 375/240.03 |
| 2009/0310678 A1* | 12/2009 | Tanaka ............... H04N 19/593 375/240.15 |
| 2010/0080292 A1 | 4/2010 | Coulombe |
| 2010/0091836 A1 | 4/2010 | Jia |
| 2010/0166060 A1* | 7/2010 | Ezure ................. H04N 19/176 375/240.03 |
| 2010/0246662 A1 | 9/2010 | Koto et al. |
| 2010/0290419 A1 | 11/2010 | Wengerter |
| 2011/0122942 A1 | 5/2011 | Kudana et al. |
| 2012/0114034 A1* | 5/2012 | Huang .................. H04N 19/70 375/240.03 |

* cited by examiner

LOW LATENCY RATE CONTROL SYSTEM AND METHOD

CROSS REFERENCE TO RELATED APPLICATIONS

This application is a divisional of U.S. patent application Ser. No. 13/067,051 filed May 4, 2011, the contents of which are incorporated herein by reference.

FIELD OF THE INVENTION

The present invention relates to transferring video signals over a network. More particularly, the present invention relates to sending and receiving complex video signals over a network having low latency constraints.

BACKGROUND

In known video transmission/reception systems, data content from a digital media server is encoded and sent to be decoded for playback on a digital media renderer. Video content, however, can be quite complex as it changes over time. As complexity changes, so does the bit rate needed for quality transmission of the content. For a given compression quality level, complexity of the video data results in a higher bit rate for encoding the data. The capacity of the network, however, may remain constant over time and does not change due to the complexity of the video data or increased bit rate.

To accommodate this bit rate fluctuation at the video encoder, rate control is used to create a constant bit rate on a network at all times. The constant bit rate remains in effect for the transmission of data even when the complexity of the video changes dramatically, such as when a scene changes or the video captures a lot of motion or fine features. Rate control strives to keep the video playback quality as stable as possible. Rate control tries to compromise between quality stability and constant bit rate requirements.

Known systems buffer the data prior to transmission due to the limits of the rate control and to meet the constraints applied by the capacity of the network. The encoded data is buffered so that the instantaneous video encoder bit rate can be higher and lower than the capacity of the network, but the rate of the buffered data sent to the network always equals or is lower than the network capacity. As the bit rate may increase substantially over the network capacity, known systems implement larger buffers to accommodate those possible large increases. The larger buffers, however, introduce latency into the transmission of the data, such that delays occur.

For example, a known system may buffer a plurality of frames after encoding before transmitting the data across the network. A large buffer size results in high latencies within the system. In some applications, this latency is unacceptable. Real-time video playback and interactive applications may not incur high latencies, and, therefore, cannot just increase buffer size to handle complex video transmissions. In fact, some applications may not allow any noticeable latency in the network. Thus, buffer size may be minimized to reduce the latency but then the system may not be able to handle the increased bit rate fluctuations due to the complex data.

SUMMARY OF THE INVENTION

Embodiments of the present invention control the video encoder output bit stream rate for scenarios requiring transmission latencies lower than the duration of a single frame in a network. The embodiments of the present invention do not implement large buffers to handle the bit rate increase due to complex video data encoding, but, instead, performs a process that allows encoding to occur with a low latency. A frame or less may be buffered according to the disclosed embodiments. The proposed rate control also may work with higher latencies to also cover systems that do not require low latency.

The disclosed embodiments allocate the necessary bits within a frame to achieve a specific maximum bit rate. By staying below the network capacity, the video transmission/reception system results a low latency desired for real-time video playback.

The disclosed embodiments control the bit allocation at a sub-frame level. A frame is divided into smaller blocks, known as rate control blocks. Rate control blocks are used as the basic unit for bit allocation. This bit allocation achieves the target bit rate desired by the system as well as meet latency constraints. The disclosed embodiments may use the slice partitioning capabilities of the video encoder. This feature allows the decoder to decode the rate control blocks independently. Whenever the encoded data size for each rate control block is lower than the bit rate allocated by the rate control, the end-to-end latency for each rate control block will be as much as the specified maximum latency.

To achieve low network latency, the disclosed embodiments use estimated and predicted values that should lead to satisfactory results. Nevertheless, a probability exists of producing an erroneous estimation that may lead to an instance where the allocated bits for the rate control block are not achieved. In other words, the bit rate may be higher than the target bit rate and exceed buffer capacity, thereby putting latency requirements at risk. To avoid this problem of buffer overflow, the disclosed embodiments may implement a buffer protection mechanism based on "not coding" parts of the rate control block. Other protection mechanisms also may be used.

According to the preferred embodiments, a method for encoding an image frame within a video transmission system is disclosed. The method includes selecting a rate control block of the image frame. The rate control block includes a plurality of macroblocks. The method also includes encoding the plurality of macroblocks of the rate control block according to the bit rate.

Further according to the preferred embodiments, a video transmission encoding system is disclosed. The video transmission encoding system includes a slice partitioner that ensures a rate control block from an image frame will have an integer number of slices. This feature allows the rate control blocks to be decoded independently. The rate control block includes a plurality of macroblocks. The video transmission encoding system also includes an encoder to encode the plurality of macroblocks for the rate control block. The video transmission encoding system also includes a buffer to store encoded data for each rate control block. A bit rate for the video transmission system and a size of the buffer are set according to a set of parameters for the rate control block.

Further according to the preferred embodiments, a method for encoding an image frame within a video transmission is disclosed. The method includes collecting statistics to be used as part of both frame and rate control block initial setting. The method also includes setting a size for a buffer to receive encoded data of the rate control. The method also includes encoding a plurality of macroblocks within the rate control block according to a bit rate corresponding to the size of the buffer.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION OF THE PREFERRED EMBODIMENTS

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

Figure 1:
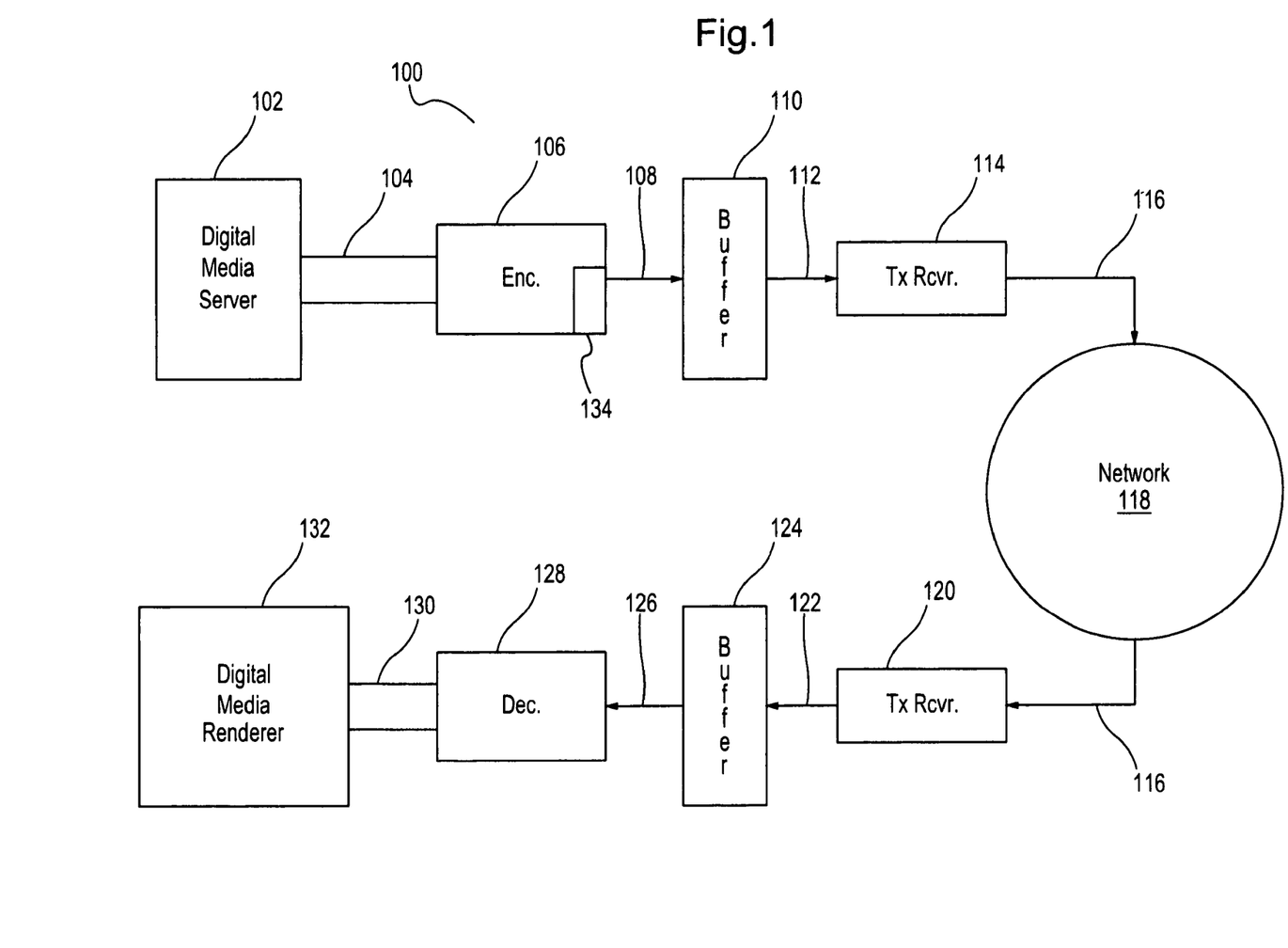
FIG. 1 illustrates a system for transmitting and receiving video signal data according to the disclosed embodiments.

FIG. 1 depicts a system 100 for transmitting and receiving video signal data according to the disclosed embodiments. System 100 may be any system or collection of devices that connect over a network to share information. Image frames within a video signal is received to be sent over the network. The data within the image frame is encoded for transmission using various encoding techniques.

System 100, for example, may be a gaming system where video content is generated in the gaming console and then transmitted to a high-definition digital media renderer, such as a flat-screen television. Alternatively, system 100 may be a security monitoring system using high definition (HD) video. This practice is becoming the norm in the surveillance industry as an increasing number of manufacturers of security cameras now claim to offer HD cameras, which allows monitoring to occur with quality video in real-time.

Digital media server 102 generates the video content to be transmitted. Digital media server 102 may be any device, console, camera and the like that captures video data. For example, digital media server 102 is a gaming console that plays videogames stored on disk or other medium. The content generated from playing the game is displayed for a user to view and interact with in real-time. Alternatively, digital media server 102 is a computer, video recorder, digital camera, scanner and the like that captures data.

Uncompressed data signal 104 is output from digital media server 102 to encoder 106. Encoder 106 may encode or compress signal 104 for transmission within system 100. Encoder 106 may use lossy compression techniques to encode signal 104. The strength of such techniques may change based on the complexity of the data within signal 104.

For example, video data of a character in a game swinging a sword against an opponent is more complex, or very busy, than video of the character merely standing and could require different encoding processes to keep similar quality. Encoder 106 includes slice partitioner 134, which is disclosed in greater detail below.

Encoder 106 outputs compressed signal 108 to buffer 110. Buffer 110 stores data from signal 108 until it can be transmitted through system 100. If the network bit rate does not allow transmission of signal 108, then buffer 110 holds the data until such time it can be transmitted by transceiver 114.

Buffer 110 may have a buffer size value. The buffer size value used by the rate control to achieve its targets (latency and bit rate) will be directly related to the maximum transmission latency admitted. Buffer 110 outputs signal 112 to transceiver 114.

Transceiver 114 transmits signal 116 over network 118. Using the gaming example from above, network 118 may be a wireless network for a location where a router receives signal 116 from digital media server 102 and forwards it to digital media renderer 132 for display. Alternatively, network 118 may be a network of computers receiving signal 116 from a remote camera showing real-time video.

Transceiver 120 receives signal 116 and outputs signal 122 to buffer 124. Buffer 124 may have a buffer size value similar to buffer 110. Signal 126 streams from buffer 110 to decoder 128. Decoder 128 decodes or decompresses signal 126 to generate uncompressed signal 130. Uncompressed signal 130 preferably is a high quality copy of uncompressed signal 104, which slight variations due to the coding process.

Digital media renderer 132 receives uncompressed signal 130 and displays the video data content to the user. Digital media renderer 132 may be a high-definition television having display resolutions of 1,280×720 pixels (720 p) or 1,920×1,080 pixels (1080i/1080p). Thus, the amount of data encoded and decoded within system 100 may be complex due to the demands place on it by digital media server 102 and digital media renderer 132.

System 100 is subject to various constraints and parameters. System 100 may transmit over network 118 at a constant bit rate. This bit rate remains the same over time, but, however, may change under certain circumstances. A delay or integration time may occur as buffer 110 fills up, which causes latency within system 100 as data is sent over network 118.

Figure 2A:
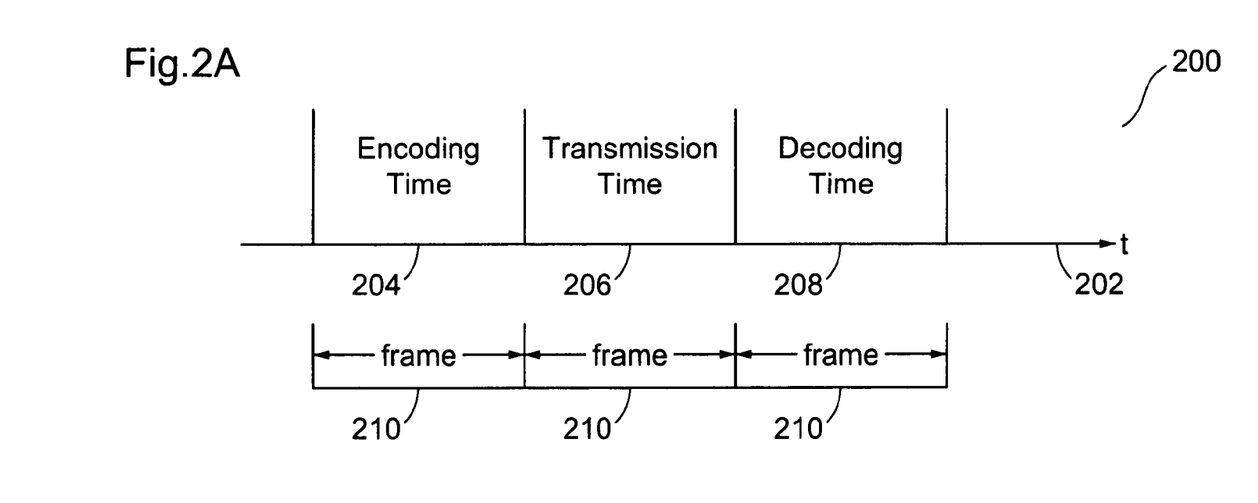
FIG. 2A illustrates a graph showing encoding, transmission and decoding times within the system according to the disclosed embodiments.

FIG. 2A depicts a graph 200 showing encoding, transmission and decoding times within the system according to the disclosed embodiments. Graph 200 includes time line 202 that shows an encoding time 204, a transmission time 206 and a decoding time 208. Encoding time 204 may represent the time for a minimum decodable unit to be encoded or compressed by encoder 106 plus the time of the number of video lines needed before start the coding process.

The minimum decodable unit for the disclosed embodiments may be one slice. After this time, encoder 106 can start to transmit this first slice. Traditional schemes wait up to 1 frame before start encoding and start transmitting the bit stream after the entire frame is encoded. This may include 2 frames of encoding time. System 100 minimizes the encoding time by minimizing the wait before starting the encoding, and making smaller the minimum decodable unit.

Encoding time 204 preferably is less than or equal to the time lapse for a minimum decodable unit. For example, if the minimum decodable unit is a frame and the length of time for frame 210 is 1/60th of a second, then encoding time 204 is less than that within system 100.

Transmission time 206 represents the time to transmit data over network 118. Transmission time 206 also is less than or equal to a time period for needed to send a buffer size number of bits over the network at the expected capacity (equal or lower than the bit rate configured for the rate control). Thus, data may not be buffered for any appreciable length of time, or system 100 may not meet these requirements on transmission. Decoding time 208 represents the time for a minimum decodable unit of video data to be decoding or uncompress to reconstruct the video signal. Decoding time 208 also is less than or equal to the time period for the minimum decodable unit. If the minimum decodable unit is a frame, this time will be less than 1 frame.

Thus, latency within system 100 is reduced as encoding time 204, transmission time 206 and decoding time 208 are kept below the time period for frames 210. Known systems may incorporate the opposite approach, where these times exceed the duration of a frame. These delays accumulate at each step in the process, which results in a high latency. Larger buffers increase these times as well. FIG. 2A shows how the latency is reduced to a level that moves the frames through system 100 well within the limits needed for real-time video rendering.

Figure 2B:
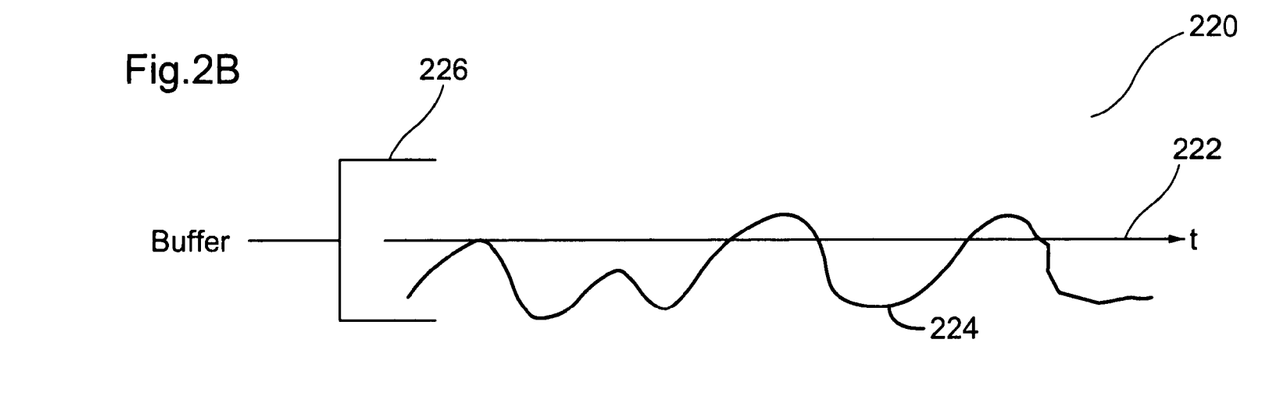
FIG. 2B illustrates a graph showing bit rate fluctuation within the system over time according to the disclosed embodiments.

FIG. 2B depicts a graph 220 showing bit rate fluctuation within the system over time according to the disclosed embodiments. Graph 220 shows time line 222, and video data bit rate line 224. Video data bit rate line 224 varies as time line 222 extends. Video data bit rate line 224 varies as the complexity of the video encoding varies. For example, video data bit rate line 224 rises as complexity increases.

FIG. 2B also includes buffer 226 that stores the video data. Buffer 226 may correspond to buffers 110 and 124 of FIG. 1. As shown, all of the data for video data bit rate line 224 fits within buffer 226. Video data bit rate line 224 does not exceed the limits of buffer 226, no matter how much line 224 varies. Buffer 226 also may have a buffer size. The buffer size may depend on the expected minimum transmission latency, less than one frame according to the disclosed embodiments. This size assures that latency is minimized.

Values may be set within system 100 to fit the relationships shown in FIGS. 2A and 2B. A constant bit rate for network 118 may set a specific maximum bit rate value for transmitting and receiving video content. In other words, a value for the necessary bits to encode a frame of video content is determined. The frame bits value and the expected latency may set the buffer size of buffer 226. For example, if the bit rate is 1000 bits, and if the expected size for a frame and the expected transmission latency is half a frame, then the buffer size will be 500 bits. The amount of data stored in buffer 226 (or buffers 110 and 124) may not exceed this value. Thus, any delay or latency within system 100 is about equal or less than the time of the frame (⅙₀th of a second if frame rate of incoming video is 60 frames per second), as shown in FIG. 2A.

Figure 3:
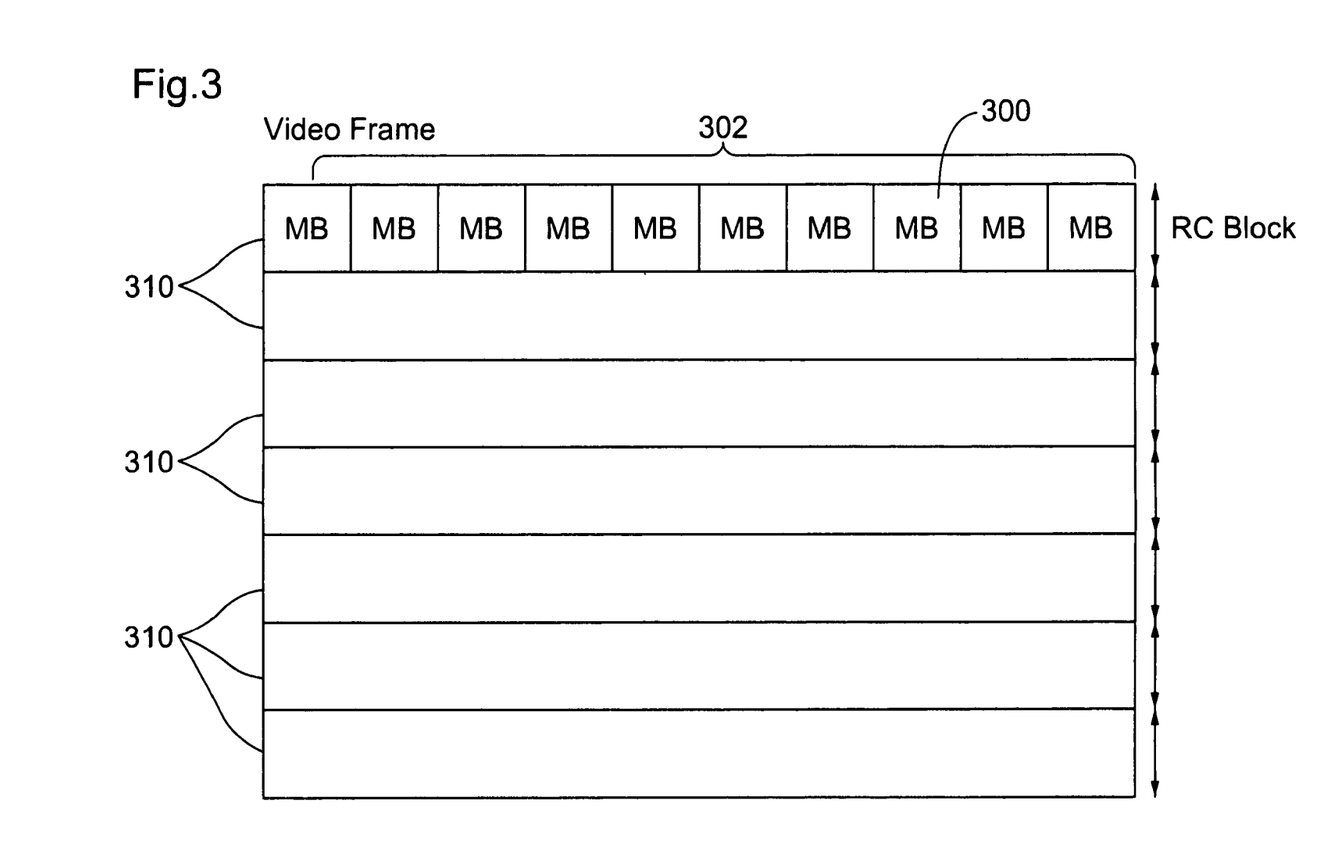
FIG. 3 illustrates a video frame having rate control blocks according to the disclosed embodiments.

FIG. 3 depicts a video frame 300 having rate control blocks 310 according to the disclosed embodiments. Preferably, every video frame 300 has the same number of bits. The bit rate for video frame 300 may increase if the picture is very busy and requires complex encoding to capture all the action.

Video frame 300 may be comprised of pixels that are grouped to form macroblocks 302. Each macroblock 302 includes two or more pixels. Preferably, macroblock 302 is 16 pixels by 16 pixels. Macroblocks 302 are encoded by encoder 106 and sent to decoder 128 using a compression scheme, or other algorithms. Information sent may include the address of the macroblock within video frame 300, luminance information, chrominance or color information, a compression level value and motion vector information.

Thus, video frame 300 may be partitioned into a plurality of macroblocks 302. In conventional video transmission and reception systems, all of macroblocks 302 of video frame 300 are encoded, buffered, and then sent through network 118. The disclosed embodiments partitions video frame 300 into rate control blocks 310 and uses these rate control blocks as the basis for encoding, transmitting and decoding video data.

Slice partitioner 134 of encoder 106 ensures that every rate control block has an integer number of slices. Rate control blocks 310 also may be known as sub-frames. Rate control blocks 310 may be used as the basic unit for bit allocation in system 100, and include a plurality of macroblocks 302. Preferably, the number of macroblocks 302 in each rate control block 310 is between 5 and 15. Rate control block 310 may include one or more slices of frame 300.

Alternatively, the number of macroblocks will depend on the maximum transmission latency expected or required. The bigger the size of rate control block 310, the higher the minimum latency achievable. Note that the opposite also works, the higher the latency required, the smaller the rate control block required.

Based on the number of macroblocks 302, rate control blocks 310 may have a target bit rate that corresponds with the duration of a rate control block 310. In other words, the target bit rate for rate control blocks 310 should be lower than that for video frame 300 as there is much less information to encode. This feature keeps the bit rate fluctuation well below a buffer size for a single video frame 300.

Buffer 110 includes a buffer size at least equal to a rate control block 310. Encoder 106 may forward each rate control block 310 after the last macroblock 302 within it is encoded. Decoder 128 may start the decoding process of each rate control block 310 independently. Thus, information is sent through system 100 at an increased rate and with reduced latency. The bit rates may fluctuate between rate control blocks 310 to accommodate "busy" parts of video frame 300, but never higher than the configured bit rate for the rate control.

Figure 4:
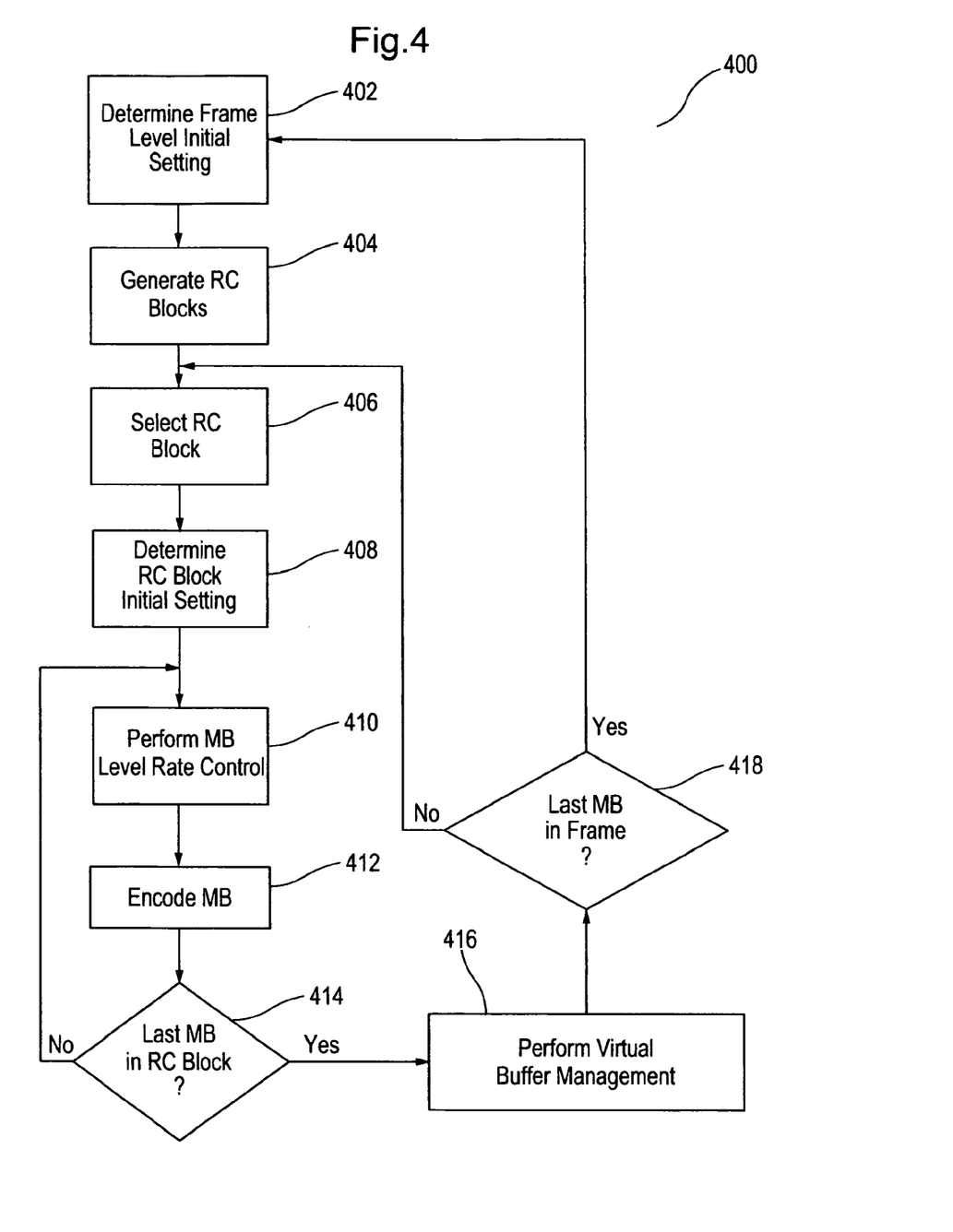
FIG. 4 illustrates a flowchart for controlling the bit rate within a video transmission encoder using a rate control according to the disclosed embodiments.

FIG. 4 depicts a flowchart 400 for controlling the bit rate within video transmission encoder 106 using rate control blocks 310 according to the disclosed embodiments. Step 402 executes by determining the frame level initial settings for a video frame 300. These settings may include the number of bits per frame, the number of macroblocks 302 per frame, the number of macroblocks 302 on a rate control block 310, the targeted bit rate and the like. Step 404 executes by generating rate control blocks 310 within video frame 300. As noted above, video frame 300 may include several rate control blocks 310 comprising macroblocks 302.

Step 406 executes by selecting a rate control block 310 for encoding and transmission. For example, referring to video frame 300, the top rate control block 310 may be selected initially and so on until the bottom rate control block 310 is encoded. Step 408 executes by determining the rate control block initial setting. A target bit rate is selected, and a buffer corresponding to the duration of the rate control block 310 is set.

Encoder 106 may allocate a number of bits based on the size of the selected rate control block 310. Based on the setting, step 410 executes by performing macroblock level rate control using the target bit rate based on the size of rate control blocks 310. Step 410 is disclosed in greater detail by FIG. 5.

Step 412 executes by encoding one of macroblocks 302 within rate control block 310. Step 414 executes by determining whether the encoded macroblock 302 is the last macroblock in rate control block 310. If no, then flowchart 400 goes back to step 410 to encode the remaining macroblocks 302. If yes, then step 416 executes by performing virtual buffer management. Encoded data within buffer 110 is forwarded to transceiver 114 for transmission through network 118. Because buffer 110 corresponds to the size of rate control block 310, data from an upper rate control block 310 is not delayed while encoding subsequent rate control blocks 310.

Step 418 executes by determining whether the last macroblock 302 within video frame 300 is encoded. If no, then flowchart 400 returns to step 406 to select the next rate control block 310. If yes, then all of video frame 300 has been encoded and a new video frame should be received. Thus, flowchart 400 returns to step 402.

Figure 5:
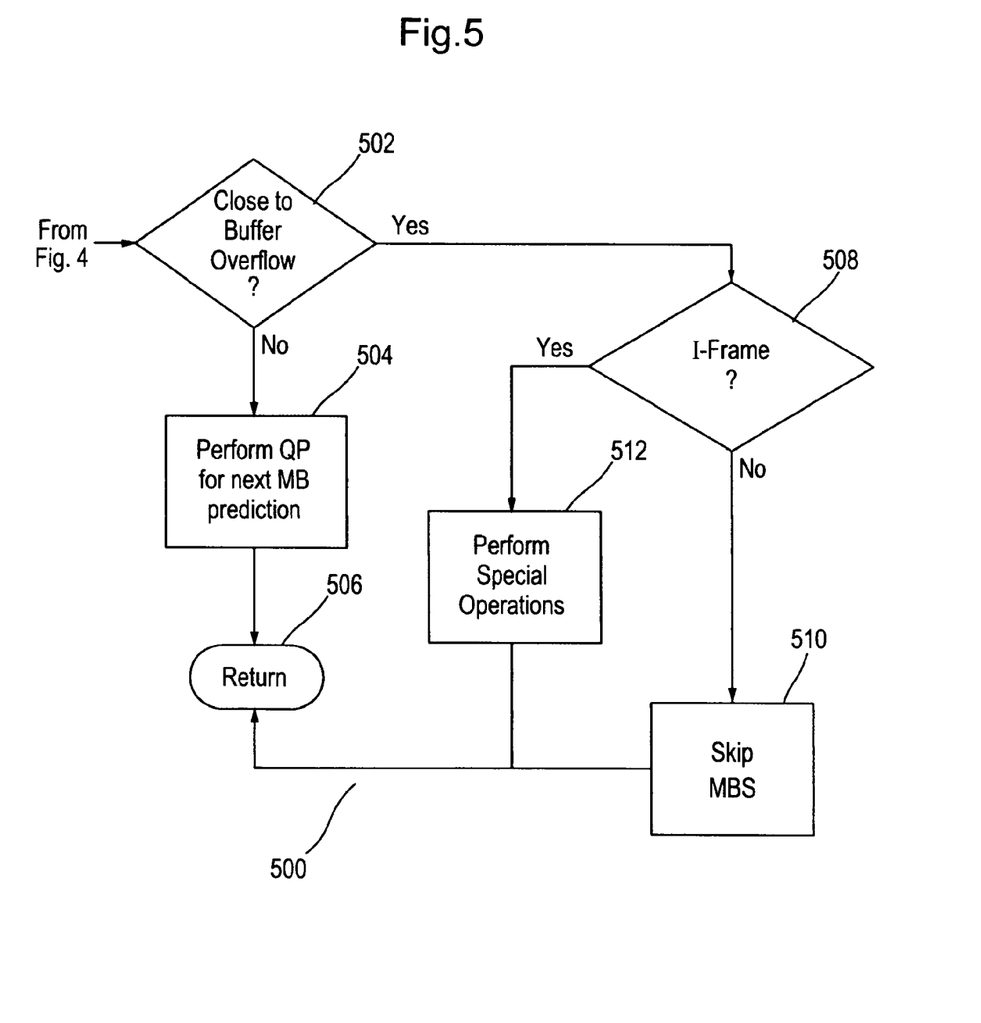
FIG. 5 illustrates a flowchart for performing macroblock level rate control according to the disclosed embodiments.

FIG. 5 depicts a flowchart 500 for performing macroblock level rate control according to the disclosed embodiments. Flowchart 500 further discloses step 410 of FIG. 4. To achieve a low latency, the disclosed embodiments may use estimated and predicted encoding values for macroblocks 302. These processes "predict" the values for a macroblock 310 during the encoding to reduce encoding time. Such predictions, however, do risk producing an erroneous estimation. This error may be especially likely to occur in a busy video frame with much movement and change from the previous frame.

For example, if video frame 300 depicts a blue sky with some clouds, encoder 106 may predict that the values for macroblock 302 within rate control block 310 are the same for the blue backgrounds. An error may occur when encoder 106 predicts that macroblock 302 has the values for a blue sky when it has the beginning data for an airplane flying in the macroblock. The airplane may be white so that macroblock 302 has values different from the ones for a blue sky, but yet encoder 106 used the predicted values anyway. Such as error may result in a high bit rate to handle the complex change in values.

Because of the low latency constraints on system 100, mistakes such as these must be avoided. The disclosed embodiments shown by FIG. 5 may perform some operations to prevent buffer overflow and the resulting latency. One such operation may be to avoid approaching the buffer size limit for a rate control block 310. Space should be left within buffer 110 to handle any sudden spikes in the bit rate due to complex variations. Despite the space, however, buffer overflow still may occur and needs to be handled accordingly.

Step 502 executes by determining whether the current bit rate for a selected rate control block 310 is close to buffer overflow. If no, then step 504 executes by performing a compression level determination for the next macroblock prediction. Using the compression level results, the disclosed embodiments may predict a similar macroblock 302 to the one it is encoding on a previously encoded video frame 300. Step 506 executes by returning to flowchart 400.

If step 502 is yes, then step 508 executes by determining whether macroblock 302 is within an entire spatial predicted frame (intra-frame, or 1-frame) or entire temporal predicted frame (inter-frame) video setting. If no, then step 510 executes by skipping the encoding process for the remainder of macroblocks 302 within rate control block 310. Instead, escape macroblocks may be used. Encoder 106 informs decoder 128 that the current frame is similar to previous frame, and those macroblocks may be used to fill out rate control block 310. Thus, buffer overflow is avoided as the bit rate does not exceed to capacity of buffer 110.

If step 508 is yes, then step 512 executes by performing special operations on the remaining macroblocks 302 within rate control block 310. In an I-frame environment, encoder 106 may not use escape macroblocks as the video data does not relate to previous video frames.

Intra-frame coding refers to the fact that the various lossless and lossy compression techniques are performed relative to information that is contained only within the current frame and not relative to any other frame in the video sequence. In other words, no temporal processing is performed outside of the current picture or frame.

Thus, the prediction scenarios may not work for 1-frame video frames. Step 512 removes partially or totally the prediction residue so that minimal information is sent. Encoder 106 keeps using 1-frame macroblocks 302 but the remaining macroblocks 302 will have most of the prediction residue being placed as 0 (zero) to reduce the number of bits being used. The result is that the bit rate is reduced to fit within the allocated bit rate for buffer 110. Flowchart 500 then returns to flowchart 400 via step 506.

It will be apparent to those skilled in the art that various modifications and variations may be made in the disclosed embodiments of the privacy card cover without departing from the spirit or scope of the invention. Thus, it is intended that the present invention covers the modifications and variations of the embodiments disclosed above provided that the modifications and variations come within the scope of any claims and their equivalents.

What is claimed is:

1. A video transmission encoding system comprising:
a slice partitioner to ensure a rate control block within an image frame is composed of an integer number of slices from the image frame, wherein the rate control block includes a plurality of macroblocks;
an encoder to encode the plurality of macroblocks for the rate control block; and
a buffer to store encoded data for each rate control block, wherein a bit rate for the video transmission system and a size of the buffer are set according to a parameter for the rate control block, and
wherein the encoder avoids overflow of the buffer by alternately skipping encoding for selected inter-frame macroblocks of the rate control block and removing prediction residue from intra-frame macroblocks of the rate control block.

2. The video transmission encoding system of claim 1, wherein the parameter to set the bit rate and the size of the buffer is related to a size of the rate control block.

3. The video transmission encoding system of claim 1, wherein the slice partitioner generates a plurality of rate control blocks from the image frame.

4. The video transmission encoding systems of claim 1, wherein the encoder is configured to perform macroblock level rate control when the buffer is in an overflow state.

5. The video transmission encoding system of claim 1, further comprising a decoder to decode the plurality of macroblocks of the rate control block using the bit rate.

6. A method for encoding an image frame within a video transmission, the method comprising:
selecting a rate control block from a plurality of rate control blocks;
determining an initial setting of the rate control block;
setting a size for a buffer to receive encoded data of the rate control block; and encoding a plurality of macroblocks within the rate control block according to a bit rate corresponding to the size of the buffer, wherein encoding includes avoiding overflow of the buffer by alternately skipping encoding for selected inter-frame macroblocks of the rate control block and removing prediction residue from intra-frame macroblocks of the rate control block.

7. The method of claim 6, further comprising partitioning the image frame into the plurality of rate control blocks.

8. The method of claim 6, further comprising selecting a new rate control block when a last macroblock of the rate control block is encoded.

9. The method of claim 8, further comprising setting the size of the buffer and the bit rate according to the initial setting of the new rate control block.

10. The method of claim 6, wherein the rate control block includes one or more slices of the image frame.

11. The method of claim 6, wherein the rate control block includes one or more slices of the image frame.

* * * * *

UNITED STATES PATENT AND TRADEMARK OFFICE
CERTIFICATE OF CORRECTION

| | | |
|---|---|---|
| PATENT NO. | : 9,445,107 B2 | Page 1 of 1 |
| APPLICATION NO. | : 14/480469 | |
| DATED | : September 13, 2016 | |
| INVENTOR(S) | : Alberto Duenas et al. | |

It is certified that error appears in the above-identified patent and that said Letters Patent is hereby corrected as shown below:

In the Specification

At Column 1, Line number 8, after "2011," insert -- now Pat. No. 8,831,108, --.

At Column 7, Line number 25, delete "310" and insert -- 302 --.

In the Claims

At Column 8, Claim number 4, Line number 55, delete "systems" and insert -- system --.

Signed and Sealed this
Twentieth Day of February, 2018

Andrei Iancu
*Director of the United States Patent and Trademark Office*